June 2, 1959 J. E. JACOBS ET AL 2,889,188
METHOD OF MAKING PHOTOCONDUCTIVE IMAGE TRANSDUCER TUBES
Filed Oct. 6, 1955
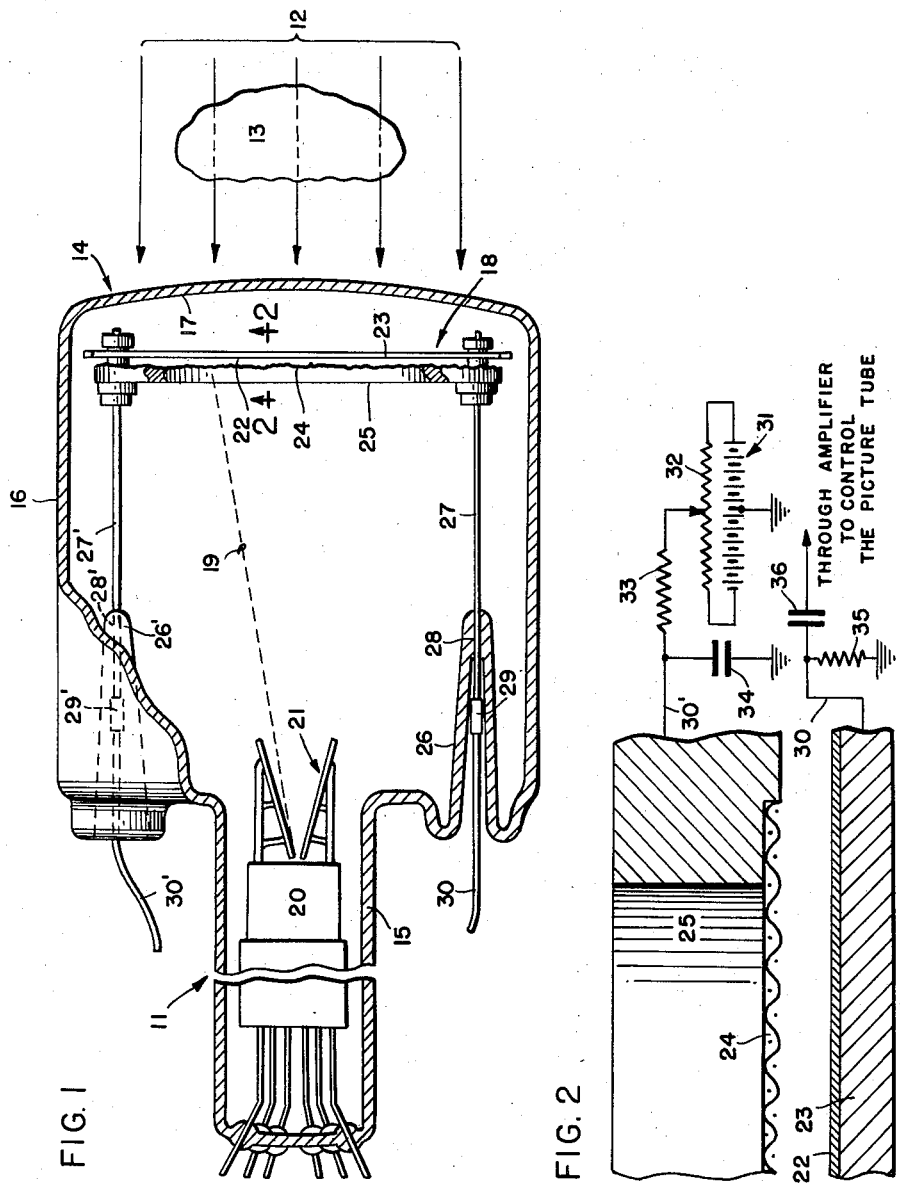
INVENTORS:-
JOHN E. JACOBS
HAROLD BERGER
BY:- Junius F. Cook, Jr.
ATTORNEY 2,889,188

METHOD OF MAKING PHOTOCONDUCTIVE IMAGE TRANSDUCER TUBES

John E. Jacobs, Hales Corners, and Harold Berger, West Allis, Wis., assignors to General Electric Company, a corporation of New York Application October 6, 1955, Serial No. 538,846

3 Claims. (Cl. 316—25)

The present invention relates in general to electronics, and has more particular reference to the manufacture of an image transducing device of the sort embodying a layer of photosensitive semi-conductor material enclosed in a sealed and evacuated envelope and adapted for the conversion to electrical signaling impulses of latent images carried by light rays, especially penetrating rays, such as X-rays, the invention pertaining more specifically to the production and testing of panel mounted layers of light sensitive, electrical semi-conducting material as separately formed and pretested elements adapted for assembly in the envelope of the transducer device prior to the evacuation and sealing thereof.

For the purpose of the present disclosure, a photosensitive semi-conductor may be defined as a material having electrical resistance, or reactance, or both, which vary in accordance with the intensity of rays to which the substance is exposed. Electrical resistance and reactance, either inductive or capacity reactance, or both, are those characteristics of electrical conductors which tend to prevent the flow of electrical current therethrough under the influence of an electromotive force. The combined flow resistive effect of resistance and reactance in a conductor material is commonly referred to as the electrical impedance of the material.

In the absence of rays to which it is responsive, a semi-conductor may have impedance characteristics of such high order as to constitute it as a virtual insulator capable of substantially preventing the flow of electrical current therethrough. When irradiated with rays to which it is responsive, the impedance of the semi-conductor material may be reduced as a proportional function of incident ray intensity, so that the material becomes electrically conducting in proportion to the intensity of exciting rays impinging thereon. As a consequence, such ray induced or controlled change in the impedance of the semi-conductor may be measured in terms of current flow therethrough, or in terms of voltage developed in an associated impedance measuring circuit, in order to determine the intensity of rays impinging on the semi-conductor.

Latent invisible picture images of an object may be formed or entrained in a beam of penetrating rays, such as X-rays, gamma rays, or other invisible ray-like emanations of penetrating character, by causing the rays to traverse the object to be pictured. Visible light rays also may carry latent picture images which may be converted to visible form by the eye of an observer or by photographic techniques. Latent picture images entrained in penetrating ray beams may also be reduced to visible form, as by applying the image carrying beam upon a film of ray sensitive material, as is common in X-ray photography or radiography. It is also conventional, as in X-ray fluoroscopy, to convert latent picture images to visible form by applying the image carrying ray beam directly upon a sensitive screen adapted to glow differentially in proportion to the intensity of rays impinging thereon, and thus to reproduce the latent ray carried image as a visible fluorescent picture on the screen.

Latent picture images carried by optically visible as well as invisible rays may be converted to electrical signal impulses capable of transmission to remotely located signal responsive picture reproducing devices, such as picturing tubes of the sort commonly employed for television picture reproducing purposes, by applying image carrying rays upon the envelope enclosed ray sensitive layer of semi-conducting material which forms a component of the transducing device. Image transducing devices of the character mentioned commonly include electron beam scanning means for producing electrical signal pulsations corresponding with the impedance characteristics of the scanned layer, as determined by the intensity of image carrying rays applied thereto.

It has heretofore been the practice, in producing image transducing tubes, to assemble tube components, including a sensitive layer carrying plate or panel, within a sealed and evacuated envelope, and thereafter to apply the ray sensitive layer of semi-conducting material in situ upon the support panel, as by evaporating the material within the envelope and causing the same to condense upon a facing surface of the panel. Such procedure is difficult of accomplishment and also expensive because of the necessity of introducing or producing a supply of sensitive material for evaporation within the sealed and evacuated envelope, and for removing residual material or evaporating equipment from the sealed tube, or otherwise accommodating the same within the tube, after deposition of the sensitive layer on the support panel. Furthermore, the production of the layer of sensitive semi-conductor material in situ on a support panel within a sealed and evacuated envelope inhibits adequate testing of the deposited layer, for mechanical and electrical uniformity and for the determination of its electrical characteristics, prior to the incorporation of the layer in the final assembly. As a consequence, it has heretofore been possible to detect defective layers only in the finished product, thereby rendering the rejection of defective layers excessively expensive.

An important object of the present invention is to provide for the manufacture of photosensitive layers for image transducing tubes as production units prior to the assembly thereof in final operative position in the tube structure, whereby the layers may be tested and rejected, if defective, prior to incorporation thereof in the sealed and evacuated envelope of the transducer device.

Another important object of the invention is to prefabricate a photosensitive layer of the character mentioned in any suitable or preferred fashion, as by the settling of powdered material on a suitable support panel, or by evaporation of the material and condensation thereof on a support, and then to test the layer for acceptance or rejection, as in scanning equipment in which the same may be demountably supported, and, after acceptance, to assemble the same as a component part of an image transducer.

Another important object is to prefabricate a photosensitive layer of the character mentioned, and to coat the same with a protective surface film, in order to guard the layer against deterioration while atmospherically exposed during intervals of the order of several hours which may elapse between the formation and testing of the layer and its assembly as a part of image transducing apparatus; a further object being to eliminate the protective layer, as an incident of the conditioning of a transducing device for operation, after assembly of the layer as a component of the device.

Another important object resides specifically in applying lead monoxide as a photosensitive layer in an image transducing tube device; a further object being to form a protective surface film of lead carbonate upon a layer of photosensitive lead monoxide, such film having thickness of the order of three microns or less and being formed by exposure of the lead monoxide layer to carbon dioxide, in order thus to guard the layer against deterioration during atmospheric exposure intervals, of the order of several hours duration, such as may elapse between the testing of the sensitive layer and its assembly as a part of an image transducing device; a further object being to provide for removing the protective film of lead carbonate after assembly of the photosensitive layer as a component part of an image transducing device; a still further object being to dissociate the lead carbonate film from the surface of a lead oxide layer by scanning the same with an electron beam, to evolve gaseous carbon dioxide, and by simultaneously gettering the image transducing tube device during the scanning operation in order to absorb and inactivate the evolved gases.

Briefly stated, the present invention provides for the production, as a prefabricated element, of a panel mounted, photosensitive layer of semi-conducting material, such as metal activated lead monoxide, or other suitable semi-conducting material, and the testing of such element, prior to the assembly thereof in apparatus, such as an image transducing tube. Where the semiconductor material is subject to deterioration upon exposure to atmosphere or other contaminants, as is the case with lead monoxide, the invention contemplates the formation of a protective film, such as a film of lead carbonate upon a layer of lead monoxide, as by exposing the layer to a film generating atmosphere, as of carbon dioxide, for the formation of a lead carbonate film upon a lead monoxide layer; the function of said film being to inhibit deterioration of the layer upon exposure to normal atmosphere during an elapsed time interval, after the production and testing of the layer and prior to assembly thereof as a component part of an image transducing tube. The invention further contemplates the elimination of such protective film, after assembly of the layer in operative position, in an image transducing tube or other device in which the layer may be assembled for use, as by electronically bombarding a lead carbonate coated lead oxide layer, in order to evolve carbon dioxide and thus eliminate the lead carbonate film, including the step of gettering the transducing tube, during electron bombardment of the layer, in order to absorb the evolved gases.

The foregoing and numerous other important objects, advantages and inherent functions of the invention will become apparent as the same is more fully understood from the following description, which, taken in connection with the accompanying drawings, discloses a preferred embodiment of the invention.

Referring to the drawings:

Fig. 1 is a sectional view through an electronic camera tube comprising an image transducer embodying a panel mounted layer of semi-conducting material, produced in accordance with the teachings of the present invention; and Fig. 2 is a greatly enlarged, fragmentary sectional view, taken substantially along the line 2—2 in Fig. 1.

To illustrate the invention, the drawings show picture producing apparatus comprising an image transducer 11 adapted to receive penetrating rays 12, such as X-rays, emanating from a suitable ray source, and latently carrying the image of an object 13 disposed in the path of the rays 12 between the ray source and the transducer 11. The transducer 11 is generally of the sort which forms the subject matter of an application for U.S. Letters Patent, Serial No. 418,414, filed March 24, 1954, on the invention of John E. Jacobs and Harold Berger, in Penetrating Ray Transducers, the same being adapted to produce electrical signal impulses corresponding with the characteristics of the image of the object latently carried by the rays 12. Signal impulses produced by the transducer may be delivered to and applied for the operation of a remotely located, picture reproducing tube of the sort commonly employed for television picture reproducing purposes.

As shown, the transducer 11 may comprise a sealed and evacuated envelope 14, preferably formed of glass, and providing a tubular electron gun housing 15 at one end of the envelope, and an enlarged portion 16 forming a scanning chamber in open communication with the gun housing at one end thereof. The envelope 14 may include a preferably outwardly bowed end wall 17 sealing and enclosing the end of the scanning chamber remote from the gun housing. Latent image pickup means 18 may be provided within the end wall 17 in position disposed in the path of the image carrying rays 12, said pickup means being also disposed in alinement with the gun housing, in position to be scanned by an electron beam 19 emitted by an electron gun structure 20 mounted in the gun housing.

The gun structure 20 may be of any suitable, preferred or convenient form, and may be used in connection with conventional horizontal and vertical beam deflecting plates 21; or conventional magnetic beam deflecting coils disposed outwardly of the gun housing may be used in conjunction with the gun for beam deflecting purposes, in accordance with well known electron scanning beam procedures. The image pickup means 18, as shown, comprises a relatively thin layer of photosensitive electrical semi-conducting material 22, said layer having substantially uniform thickness and being coated upon and in electrical contact with a suitable support panel or plate 23 of electrical conducting material.

It has heretofore been customary, in producing image transducing tubes and other devices embodying layers of photosensitive material, to form or produce the photosensitive layer within the sealed and evacuated envelope of the device, as by first mounting a suitable layer carrying panel or plate therein, and thereafter by applying the sensitive material as a layer, in situ, on the support panel, as by evaporating the semi-conducting material within the envelope and causing the same to condense upon a facing surface of the panel, usually, if not invariably, under low pressure, substantially vacuum conditions. The present invention proposes the fabrication of the panel mounted layer of semi-conducting material as a preformed unit, and the testing of the same prior to its assembly in and as a component part of the image transducing tube structure. To this end, the material of the layer 22 preferably comprises a substance that, when applied upon the support panel 23, is either substantially inert to atmosphere, or else can be conditioned to prevent deterioration of the layer in response to such atmospheric exposure as is necessary to permit the same to be transferred from the station, such as a vacuum chamber in which the layer may have been formed and tested, to the envelope structure in which the layer is to be sealingly enclosed.

The support panel or plate 23 may comprise any suitable or convenient electrical conducting material. The material is preferably transparent to image carrying rays so that the layer 22 may be applied upon the back of the panel, that is to say, the side of the panel which is remote from the side thereof upon which image carrying rays are to be applied. Where the image to be transduced is carried by penetrating rays, such as X-rays, the panel 23 may conveniently be formed of preferably thin gauge aluminum, or other metal that is substantially transparent to X-rays, while material, such as electrical conducting glass, or other optically transparent electrical conductor, may be employed in devices for transducing images carried by visible light rays.

The layer 22 of light sensitive semi-conducting material may be applied upon the panel 23 by disposing the same in a closed evaporation chamber containing a tray or boat of platinum filled with activated semi-conducting material preferably in powdered form. The plate may be supported immediately above the boat in position to receive the layer 22 upon the surface thereof which faces downwardly toward the boat. The evaporation chamber, if desired, may be evacuated and maintained under low vacuum pressure conditions, as by connecting the same with a suitable exhaust pump. Boat carried semi-conducting material may then be evaporated by heating the same, as by means of an induction heating coil, or other suitable heating means. The vaporized material thus produced in the closed chamber will be applied to and will condense upon the boat facing surface of the plate 23, thereby forming the layer 22 upon the panel.

A layer of semi-conducting material may also be applied on the panel 23 by suspending material in powdered condition in a suitable binder, such as a solution of potassium silicate. Photosensitive layers of semi-conducting material have been successfully produced, for example, by suspending the material in a solution of potassium silicate, the semi-conducting material being allowed to settle out of the solution upon the support panel, after which the excess solution may be drained off and the layer dried during an interval of the order of an hour or more, and then baked at a temperature of the order of 100° C., in a vacuum, if desired, in order to solidify the layer and adhere the same tightly upon the mounting plate.

The layer 22 may also be applied on the panel 18, as described in an application for U.S. Letters Patent, Serial No. 270,235, filed February 6, 1952, on the invention of John E. Jacobs in Semi-Conductive Layers and Method of Making the Same, now abandoned, by first mixing the semi-conducting material, in finely divided powdered or dust-like condition, with a suitable carrier or binder, such as lacquer, then painting or spraying the carrier mixed material as a thin coating upon the support panel, and finally drying the coating, including the step of heating the same, preferably at low, substantially vacuum pressure, and at a temperature assuring removal of all evaporable components of the carrier, to thereby tightly bind the semi-conducting material on the panel.

After the layer 22 has thus been applied on a surface of the panel 18, preferably under low pressure conditions, as in an evacuated chamber, it may be treated to render the same immune to deterioration upon exposure to normal atmosphere, at least for a period of time sufficient to allow the same to be transferred from the chamber where made and tested to the place of assembly within the envelope 14.

Layers comprising lead monoxide may advantageously be exposed to carbon dioxide gas in order to produce a relatively thin film of lead carbonate coated upon all exposed surfaces of the layer, such film having thickness of the order of three microns or less, and serving to guard the underlying portions of the layer against deterioration during atmospheric exposure intervals of the order of two hours, thus affording ample time for the removal of the panel mounted layer from the vacuum chamber in which made and tested, and the transfer of the layer to, and the ensealment thereof in, the envelope 14. Panel mounted layers of lead monoxide may thus be treated to coat the same with lead carbonate, either by introducing carbon dioxide gas into the chamber in which formed, or by exposing the same to atmosphere containing not less than a normal proportion of carbon dioxide, and not more than normal traces of deleterious components.

After completion of the transducing tube, irradiation of the layer 22 by image carrying rays 12 will correspondingly alter the impedance of the material of the layer, and thus apply in the layer 22 a latent image corresponding with the ray carried image to be transduced, said latent image being defined in the layer 22 in terms of the impedance characteristics of each integral portion of the irradiated layer. The transducer 11 thus provides means for succesively and repetitively measuring the ray controlled impedance of each integral portion of the layer 22, to thereby produce transmissible signals corresponding with the impedance defined latent image induced in the layer 22. To these ends, the pickup means 18, in addition to the layer 22 and its support panel 23, may comprise a foraminous layer 24 mounted in closely spaced relationship with respect to the panel 23, in position overlying the surface thereof which carries the layer 22.

The foraminous layer 24 may comprise a fine mesh, woven metal wire screen, of the order of 60 meshes per lineal inch, the panel 23 and wire screen 24 being electrically insulated, the one from the other, and being supported in spaced relation, such spacement being preferably of the order of one-eighth inch. The foraminous screen 24 may be tightly stretched and secured upon a suitable support frame 25, the marginal edges of the screen being electrically and mechanically secured to the frame, as by means of solder.

The envelope 14 may embody re-entrant portions 26, 26', carrying stems 27, 27' of electrical conducting material forming glass-to-metal seals 28, 28' with said re-entrant portions, the stems 27, 27' having portions extending in the enlarged envelope portion 16 and terminating adjacent the end wall 17 of the envelope, and opposite end portions extending outwardly of the envelope through the re-entrant portions 26, 26', said outwardly extending portions of the stems 27, 27' being electrically connected, as at 29, 29', with preferably flexible conductors 30, 30'. The screen carrying frame 25, as well as the panel 23, may be mounted upon the stems 27, 27' in manner presenting the panel and screen immediately inwardly of the envelope end wall 17, in position centered with respect to the electron gun structure 20, the screen 24 being disposed in parallel spaced relation with respect to the layer 22, and between it and the electron gun structure. The panel 23 and the frame 25 may be mounted upon the stems 27, 27' in fashion electrically connecting the panel only with one of the stems, such as the stem 27, and the frame 25 only with another stem, such as the stem 27', both the panel and frame being mechanically supported on all of the stems.

When the transducer is in operation, a potential difference of desired value supplied from a suitable unidirectional power source 31 may be maintained between the panel 23 and the foraminous screen 24. To this end, the power source 31 may be medially connected to ground, the opposite ends of the source being connected across a resistor 32 forming a potentiometer having an associated adjustable tap. The tap may be connected with the foraminous screen connected conductor 30' through a resistor 33. By adjusting the potentiometer tap, any desired positive or negative voltage, with respect to ground, within the range of voltage supplied by the power source 31, may be applied to the mesh screen 24. If desired, the screen may be connected to ground through a condenser 34, and the plate or panel 23 may be connected to ground, as through the conductor 30 and an output resistor 35.

When the layer 22 is dark, that is to say, when it is not being irradiated by image carrying rays 12 to which it is responsive, the voltage drop across the layer 22, when the same is scanned by the electron beam 19, will be merely the relatively small current loss characteristic of the constituent material of the layer. When the layer is irradiated by rays to which it is sensitive, the voltage drop across the layer, at the spot of impingement of the scanning beam 19 thereon, will be directly proportional to the intensity of layer impinging rays. Such voltage drop, however, will be instantly restored from the power source 31, since the scanning beam 19 serves as a conduction path between the foraminous screen 24 and the facing surface of the layer 22. The extent of such restoration may be measured in terms of a fluctuating voltage developed across the output resistor 35; and such voltage will accurately define the latent image imposed upon layer 22 by the layer exciting rays 12. The voltage developed across the resistor 35 may be applied through a coupling condenser 36 as a signal for controlling the operation of a remotely located picture reproducing viewing tube.

Accordingly, after formation and testing of the layer 22, as in the sealed chamber in which it shall have been produced, it may be transferred, in a sealed and evacuated transportation case if desired, to an assembly station where it may be mounted upon suitable support means 23, and then sealingly enclosed within the envelope 14, which may then be evacuated and gettered.

The present invention also contemplates the conditioning of the layer 22 after assembly thereof within the envelope 14, in order to eliminate any protective film which may have been applied to prevent atmospheric deterioration of the layer. Where the protective film comprises lead carbonate applied as a coating upon a photosensitive layer 22 of lead monoxide, the protective film may be eliminated by electronic bombardment of the layer. Such bombardment may be accomplished by operating the gun structure 20 to scan the layer with the electron beam 19. Application of electrons to the layer converts the lead carbonate of the protective layer to lead monoxide, and evolves carbon dioxide gas. By performing a gettering operation simultaneously with electron bombardment of the layer, as by evaporating barium or other gettering substance within the envelope, the evolved gas may be absorbed, as is conventional in the gettering of evacuated electron flow tube devices.

It is thought that the invention and its numerous attendant advantages will be fully understood from the foregoing description, and it is obvious that numerous changes may be made in the form, construction and arrangement of the several parts without departing from the spirit and scope of the invention, or sacrificing any of its attendant advantages, the form herein disclosed being a preferred embodiment for the purpose of illustrating the invention.

The invention is hereby claimed as follows:

1. The method of making a penetrating ray transducer, which comprises preforming a panel mounted layer of photosensitive semi-conducting material, then applying a protective coating upon the layer to inhibit atmospheric deterioration of the material, thereafter transferring the panel mounted layer to and the assembly and ensealment thereof in an evacuated envelope, and finally removing said coating to thus condition the layer for use as a ray transducing element.

2. The method of making a penetrating ray transducer, which comprises preforming a panel mounted layer of photosensitive lead monoxide, exposing the layer to carbon dioxide to form a protective coating of lead carbonate thereon to inhibit atmospheric deterioration of the layer, thereafter transferring the panel mounted layer to and the assembly and ensealment thereof as a ray transducing element in an evacuated envelope, and finally driving carbon dioxide from said coating to thereby condition the layer for use as a ray transducing element.

3. The method of making a penetrating ray transducer, which comprises preforming a panel mounted layer of photosensitive lead monoxide, exposing the layer to carbon dioxide to form a protective coating of lead carbonate thereon to inhibit atmospheric deterioration of the layer, thereafter transferring the panel mounted layer to and the assembly and ensealment thereof in an evacuated envelope, and finally electronically bombarding the layer to eliminate the protective layer and to evolve carbon dioxide gas, while gettering said envelope to absorb the evolved gas and thereby condition the transducer for operation as such.

References Cited in the file of this patent

UNITED STATES PATENTS

| | | |
|---|---|---|
| 2,041,802 | Wilson et al. | May 26, 1936 |
| 2,403,745 | Norton | July 9, 1946 |
| 2,686,735 | Thomas | Aug. 17, 1954 |
| 2,687,484 | Weimer | Aug. 24, 1954 |
| 2,730,638 | Cashman | Jan. 10, 1956 |
| 2,746,831 | Chapman | May 22, 1956 |